United States Patent Office 2,832,691
Patented Apr. 29, 1958

2,832,691

COMPOUNDING MATERIAL FOR RUBBER AND RUBBER SUBSTITUTES

Clifford G. La Crosse, Baltimore, Md.

No Drawing. Application December 26, 1956
Serial No. 630,468

4 Claims. (Cl. 106—123)

This invention relates to compounding materials for use with rubber and rubber substitutes, and to materials used for improving the processing characteristics and physical properties of natural and synthetic rubbers.

There are numerous types of rubber and plastics used in the rubber industry, principal among which are natural rubber, GR-S (a 75% styrene—25% butadiene synthetic product), and neoprene (Dupont's chloroprene synthetic rubber product). When making finished products from any of these and similar rubbers, it is necessary to introduce other agents into their compounding. These added materials include resins, oils, waxes, asphalts and tars, as well as mineral ingredients such as clays, whiting, metal oxides, silicates, etc., depending on the end product desired.

Various types of rubber "as is" are generally tough, and without the use of some type of plasticizing or processing agent, the fillers, pigments, etc. could not be properly dispersed and the desired physical properties could not be obtained. The rubber therefore requires softening, which is done by various resins, oils etc. giving the rubber those permanent softening and plasticizing characteristics desired. In general, processing procedures include first the pre-mastication of the rubber stock in a regular rubber mill or Banbury mixer to form what is known as the "crude bank." Then the compounding ingredients are added to the rubber bank.

There have been a great variety of processing aids used in the rubber industry. Some of them merely plasticize and soften the rubber batch; others are used because of their ability to plasticize, disperse fillers, and add to the flexibility of the ultimate vulcanizate, as well as their ability to make the rubber more resistant to flex crack growth, and more resistant to abrasion and oxidation. This invention relates to a compounding agent which belongs to the latter group, and is not only highly useable in the formulation of the various types of rubber compounds, but is equally suitable in the processing of natural rubber and synthetic rubber, assisting in the dispersion of pigments of various kinds that are presently being used in the industry, such as clay, Silene, Zeolox, Hi-Sil, and the like, without having any deleterious effect on the rubber.

In the past, compounding materials have been available either in solid form, which necessitates a laborious and expensive grinding process before use in the rubber, or in liquid form, which introduces additional costs of handling and shipping, and makes for inaccuracies in use.

It has now been found that it is possible to make available to the rubber industry in powder form a compounding material which will plasticize and strengthen natural rubber and other rubber like materials. The process of this invention produces a compounding material in powder form without it being necessary to go through the expensive, onerous and time consuming procedure of grinding the solid material. Also, by the process of this invention the compounding resin is produced in a much shorter time than hitherto, since it is not necessary to allow the compounding material to get cold enough for grinding, the temperature being reduced within a matter of minutes with a fine powdered product as the result.

The process of this invention is as follows: Polystyrene and unsaturated naphthenic oils are cooked together to a temperature of 525°–600° F. The temperature is then allowed to drop back to 400° F., and the hot resin mix is flown into a blending chamber containing Micro-Cel, a Johns-Manville synthetic calcium silicate produced by a hydrothermal reaction of diatomaceous earth with a source of calcium by the process described in U. S. Patent 1,574,363. This Micro-Cel is a very fine powder, made in several grades but for use in this invention it has been found that the grade known as 1–A is the most desirable. Typical properties of this grade of Micro-Cel are as follows: color, off white; loose weight density, lbs./cu. ft., 7.5; wet density, lbs./cu. ft., 11.5; absorption, percent of weight, for water, 450, for oil 425; percent retained on 325 mesh, maximum, 1.0; particle size, average ultimate, micron, 0.02; pH, 9.0; specific resistivity, ohms, 3000; brightness, TAPPI, 62; surface area, sq. meters/gram, 150; specific gravity, 1.89; refractive index, 1.53; and moisture-free, percent by weight, 8.0. A typical chemical analysis is as in the following table:

| Percent by Weight | As Received Basis |
|---|---|
| Ignition Loss, 1,800° F | 18.0 |
| CaO | 25.3 |
| $SiO_2$ | 51.7 |
| $Al_2O_3$ | 1.8 |
| $Fe_2O_3$ | 0.9 |
| $Na_2O$—$K_2O$ | 0.5 |

This particular grade has the lowest specific gravity of the various grades available, and provides the optimum results. After blending for a few minutes by agitation, the temperature of the material is thereby rapidly reduced, and the powdered product is ready for immediate shipment. The powdering procedure is thus almost instantaneous, a tremendous time and expense saving advantage over all the hitherto known processes of mixing, cooling and grinding.

The process of this invention thus eliminates the need for expensive grinding equipment as well as the labor costs involved in the grinding process, and additionally decreases the time involved in cooling from the usual 36 hours or so to less than one hour from the finished cooking time of the resin. In actual operation this has resulted in a saving of $2.50 per 100 lbs. of output.

The preferred embodiment of the invention comprises a blending of polystyrene and naphthenic oil.

*Typical values of polystyrene as indicated in the invention*

| Property | ASTM Test Method | Polystyrene #1 | Polystyrene #2 |
|---|---|---|---|
| Tensile strength, 1/8" bar, p. s. i. | D638-52T | 4,000-5,000 | 6,000-7,000 |
| Elongation, percent | D638-52T | 22-35 | 1.5-2.5 |
| Modulus in tension × $10^5$ p. s. i. | D638-52T | 3.3-3.8 | 4.4-4.8 |
| Impact strength: | | | |
| Izod notched, 1/8" bar, ft.lb./in. of notch | D256-47T | 1.5-3.0 | 0.3-0.6 |
| Izod unnotched, 1/8" bar, ft. lb./in. of width | | 10-20 | 2-6 |
| Flexural strength, 1/8" bar, p. s. i. | D790-49T | No failure | 12,000-15,000 |
| Heat distortion, 1/2" x 1/2" bar, °F | D648-45T | 160-170 | 175-185 |
| Flammability, in./min., 1/8" bar | D635-44 | 1.2 | 1.0 |
| Rockwell Hardness | D785-51 | M30-45 | M68-80 |
| Specific gravity | D792-50 | 1.04-1.06 | 1.05-1.07 |
| Dielectric constant: | | | |
| 60 cycles | D150-47T | 2.45-2.65 | 2.45-2.55 |
| $10^6$ cycles | | 2.45-2.65 | 2.45-2.55 |
| Power factor: | | | |
| 60 cycles | D150-47T | 0.0003-0.0005 | 0.0001-0.0003 |
| $10^6$ cycles | | 0.0004-0.0010 | 0.0001-0.0004 |
| Refractive index | D542-50 | | 1.59 |
| Transmission, total luminus, percent | D1003 | | 88-90 |
| Thermal coefficient of expansion, in./in./° C | D696-44 | $6.5-8.5 \times 10^{-5}$ | $6-8 \times 10^{-5}$ |

The naphthenic oil is of the following approximate analysis:

Viscosity, SUS @ 210° (or in lighter viscosity of the same range of flash and fire point, and of naphthenic origin _____ 80-100
API gravity @ 60° F _____ 12.5-15
Flash, open cup, °F., min _____ 380
Fire, °F., min _____ 450
Color, ASTM _____ 2
Aniline point, °F _____ 110-130
Aromatics, percent (vol.), min _____ 70
Billing wt., 16/gal _____ 8.110

One part of the polystyrene and three to four parts of the naphthenic oils are completely blended by heating in a kettle to a temperature of 525°-600° F. The temperature is then allowed to drop to 400° F. The hot resin is then allowed to flow into a blending chamber containing powdered Micro-Cel, the proportions being 300 parts of liquid resin mix to 100 parts of Micro-Cel. Upon agitation in the blender for about 5 minutes, the resin is completely dispersed and absorbed by the powder, and the temperature has dropped sufficiently so that the powdered material which results may be dumped into drums for immediate shipment.

The above examples are for purposes of illustration only, and not to be taken in a limiting sense. The proportions used may vary from those cited in the above example. The amount of resin mix may range from 2-4 units for each unit of Micro-Cel powder. Also, unheated material can be used, such as liquid polystyrene and unsaturated naphthenic or tall oils, tall oils being described in this inventor's prior Patent No. 2,421,627, and the blending and agitation may be performed in a hot or cold roller mill as easily as in a Banbury mixer because of the fineness of the mix. There are a number of oils that may be used such as Circosol 2XH, a processed petroleum hydrocarbon oil or Sundex 41 or the Deutrex oils, both unsaturated hydrocarbon oils, and naphthenics from Standard Oil.

When using cold material, such as certain types of liquid polystyrene and oil such as unsaturated naphthenic or tall oils which are highly acceptable in the processing of rubber, it is found that the procedure of powdering is almost instantaneous, the manufacture of the material being consummated in less than five minutes of the entry of the liquid materials into the powder (Micro-Cel), all of which can be seen very readily to be a step far forward in the cost of solidifying base materials for manufacture to be used as processing material in the rubber industry.

By the process of this invention, a refined powdered compounding material is made easily and quickly which is an efficient processing material for plasticizing and strengthening both natural rubber and other rubber like materials, and which is easily and readily mixable therewith.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A compounding material for natural and synthetic rubber consisting of the powdered product obtained by blending a mixture of one part polystyrene and three to four parts of unsaturated naphthenic oil which has been heated to 525°-600° F. and then immediately allowed to cool to approximately 400° F. with a powdered synthetic calcium silicate produced by a hydrothermal reaction of diatomaceous earth with a basic calcium compound, the proportions of resin oil mix being two to four times the amount of powdered silicate.

2. The process of making a finely powdered rubber compounding material by heating one part of polystyrene with three to four parts of unsaturated naphthenic oils to a temperature of 525°-600° F., then cooling the mix to approximately 400° F., then blending three parts of the resin mix with one part of a powder for five minutes by agitation, the powder being a synthetic calcium silicate produced by a hydrothermal reaction of diatomaceous earth with a calcium compound.

3. The process of making a finely powdered rubber compounding material by mixing a liquid polystyrene and an oil from the group consisting of unsaturated naphthentic and tall oil with a powder for not over five minutes, the powder being a synthetic calcium silicate produced by a hydrothermal reaction of diatomaceous earth with a basic calcium compound.

4. The compounding material of claim 1 in which the heated mixture of polystyrene and unsaturated naphthenic oil contains one part of polystyrene to three parts of oil.

References Cited in the file of this patent

UNITED STATES PATENTS

| 2,403,964 | Bannon et al. | July 16, 1946 |
| 2,421,627 | La Crosse | June 3, 1947 |
| 2,601,273 | Gerhart | June 24, 1952 |